April 19, 1955
E. J. WHITE
2,706,509
MEANS FOR INDICATING TIRE TREAD WEAR
Filed April 1, 1950
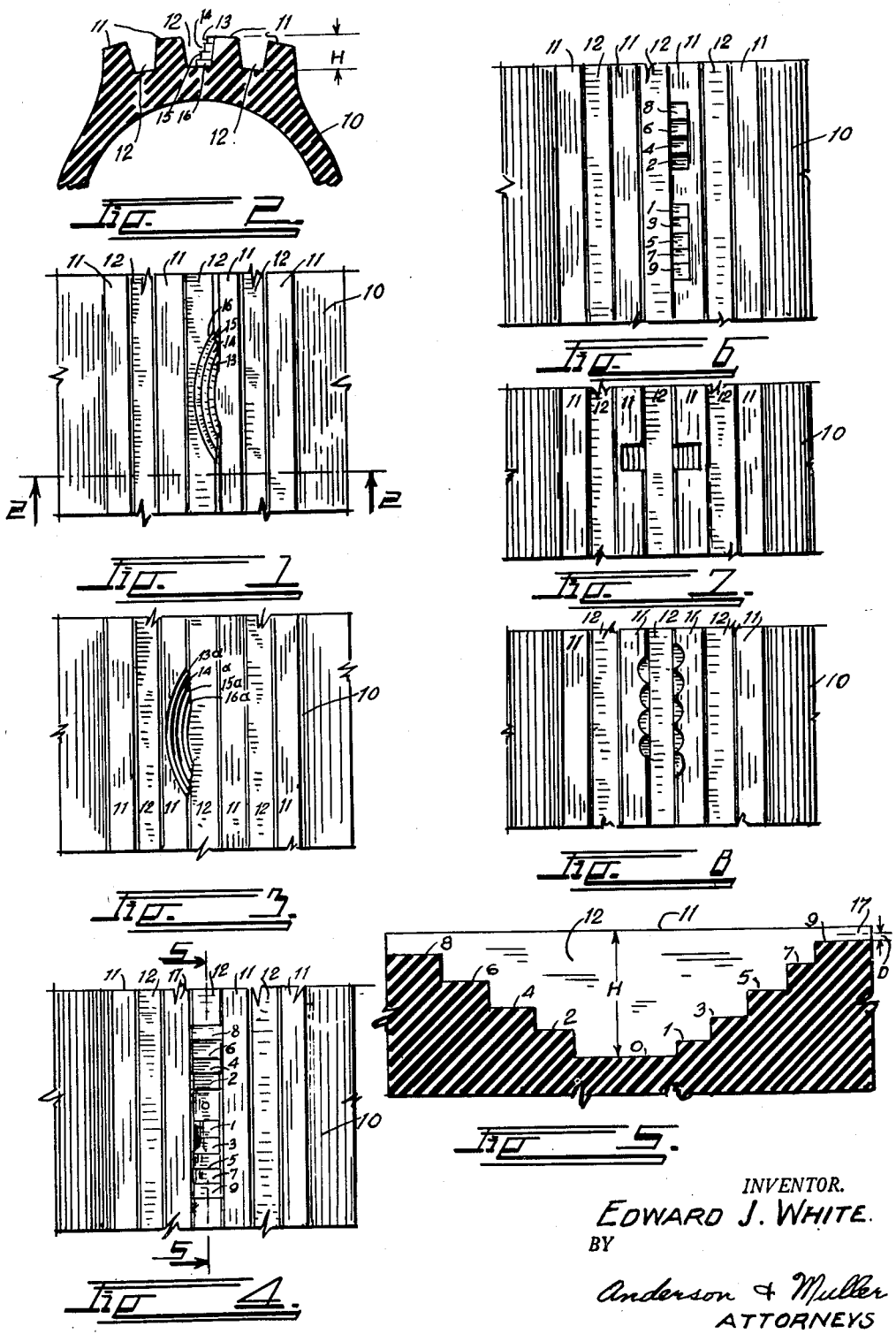
INVENTOR.
EDWARD J. WHITE.
BY
Anderson & Muller
ATTORNEYS

United States Patent Office 2,706,509
Patented Apr. 19, 1955

2,706,509

MEANS FOR INDICATING TIRE TREAD WEAR

Edward J. White, Denver, Colo., assignor to The Gates Rubber Company, Denver, Colo., a corporation of Colorado Application April 1, 1950, Serial No. 153,375

4 Claims. (Cl. 152—209)

This invention relates to rubber vehicle tires and more particularly to means for indicating the amount of wear of the tire tread.

Tires are often sold with a guarantee of replacement for failure, the adjustment for replacement being based upon the percentage of actual tire wear to the total possible tire wear. Thus, for example, if one-half of the tire tread were worn away at the time of adjustment, the tire user would receive credit for one-half the cost of a new tire. The amount of wear at any time is difficult to determine, and must usually be estimated, this often leading to controversy between the tire user and seller.

Pleasure car or truck owners also often desire to know the percentage of useful life remaining in a tread so that operating costs may be assessed, or to determine from the condition of wear whether or not wheels may be misaligned, or whether the wear has reached a point where a tire is unsafe.

The principal object of the present invention is to provide tire wear measuring means incorporated in the tire tread which will indicate at all times, by visual inspection, the amount of wear and the remaining potential wear in a tire.

Another object is to provide a plurality of stepped surfaces in the tread which surfaces are a measure of tire wear.

Further objects, advantages, and salient features will become more apparent from the description to follow, the appended claims, and the accompanying drawing, in which:

Figure 1 is a top plan view of a fragment of a tire;
Figure 2 is a section taken on line 2—2, Figure 1;
Figure 3 is a top plan view of a fragment of a tire showing an alternative form of the invention;
Figure 4 is a similar view showing another alternative form of the invention;
Figure 5 is an enlarged section taken on line 5—5, Figure 4, and
Figures 6, 7, and 8 are fragmentary top plan views of further alternative forms of the invention.

Referring in detail to Figures 1 and 2, a conventional tire 10, having any type of tread ribs 11 thereon is illustrated, the distance H from the top of the tread, when the tire is new, to the bottom of voids 12, representing the total amount of possible wear to the point of wear where the tire is smooth.

A plurality of stepped surfaces 13, 14, 15, 16 are molded in the tire, forming a portion of the tread thereof, these surfaces being in one of the voids between adjacent ribs. During the first one-quarter of total tire wear, surfaces 13, 14, 15, and 16 will all be visible, which will indicate that the tire wear is between zero and one-quarter of the total potential wear. When surface 13 is entirely worn away and the tire is worn into the next stepped surface three steps will be visible, which will indicate that the tire wear is between one-quarter and one-half of the total potential wear. Similarly, when only two stepped surfaces remain, the tire wear will be between one-half and three-quarters, and when only one stepped surface remains, the tire tread will be in a condition of wear of the last one-quarter thereof. In Figures 1 and 2 only four stepped surfaces have been illustrated to simplify the drawing, but it is to be understood that any number of surfaces may be provided to render the indicating means as sensitive as desired.

Figure 3 illustrates the same principle of the invention and differs only in that the stepped surfaces 13a to 16a are in the rib 11 rather than in the void 12.

Figures 4 and 5 illustrate one manner in which the stepped surfaces may be arranged to more sensitively indicate tread wear. The stepped surfaces are disposed in the void, as in Figures 1 and 2, but consists of two sets. Surfaces 8, 6, 4, and 2 are disposed one-fifth, two-fifths, three-fifths, and four-fifths, respectively, of the distance H between the top of the unworn tread and the bottom of the void 12. Surface 1 is midway between surfaces 0 and 2, and surfaces 3, 5, 7, and 9 step up in increments of one-fifth H. When the tread has worn to line 17 ten surfaces will be visible, these being 9, 7, 5, 3, 1, 0, 2, 4, 6 and 8, and the wear will be between zero and one-tenth. Similarly, when the tread wears down the surfaces are merely counted, in like fashion, and the visible number divided by 10 will indicate the percentage of wear to an accuracy not to exceed 10%. The amount of wear between steps may be estimated and actual wear estimated to a still higher degree of accuracy. Thus, if distance D were about one-quarter on the height of a step, the wear could be estimated to an accuracy of about 5%. It will be apparent that any number of stepped surfaces may be employed to obtain any desired degree of accuracy.

Figure 6 illustrates the same application of the invention just described, except that the stepped surfaces are in the rib 11 rather than in the void 12.

Figures 7 and 8 also illustrate the same application of the invention, except that the two groups of steps are disposed in adjacent ribs. In Figure 8 a plurality of cut-outs are provided, these extending to different depths as indicated by the ordinals in Figure 5. Counting the remaining steps or cut-outs in Figures 7 and 8 indicates percentage of wear in the same manner described in connection with Figure 5.

While a plain ribbed tread has been illustrated, it will be apparent that the invention may be practiced with any desired tread, shape, or design. Also, if the tread cross section is such that equal stepped increments would not accurately indicate percentage of wear they may be made unequal so that they accurately indicate the tire wear.

It will also be apparent that any number of indicating means of the types described may be provided in the periphery of the tire, these being disposed at spaced intervals so that the tire will be in dynamic balance, two of such means spaced 180 degrees apart being the minimum for this purpose.

Having described the invention, what I claim as new is:

1. A vehicle tire having a rubber-like tread thereon provided with a plurality of circumferential ribs spaced to form voids, wear indicating means comprising portions integral with a rib, extending into the corresponding void at equiangularly spaced distances, each of said portions having a plurality of radially spaced stepped surfaces facing outwardly and visible from the outside of the tire, each step representing a proportional degree of tread wear, said portions being short compared to the circumference of the tire, the equiangular spacing serving to maintain the dynamic balance of the tire.

2. A vehicle tire having a rubber-like tread thereon subject to wear, said tread comprising a plurality of spaced ribs forming voids therebetween, wearable rubber means positioned in at least one of said voids, forming an integral part of the tread for indicating a plurality of predetermined degrees of wear, said means comprising a plurality of adjacent stepped surfaces at different distances from the bottom of the void adapted to be counted, as the tread wears, and be compared with the original number of steps, to determine the proportionate wear, at any condition of wear, to the potential wear, said means extending for a relatively small portion of the tread circumference.

3. A vehicle tire of the type in which the tread surface is provided with a plurality of grooves that separate the surface into ribs separated by voids, means forming an integral part of the tire tread for indicating on inspection the degree of wear, said means comprising a plurality of wear indicating devices spaced equiangularly about the periphery of the tire, each device having its outer surface provided with a plurality of radially spaced stepped surfaces visible from the outside of the tire, the radial distance between said stepped surfaces being a proportional part of the distance from the outer surface of the adjacent rib to the bottom of the corresponding void so that by counting the remaining surfaces the proportional extent of the wear can be closely approximated.

4. A vehicle tire having a rubber-like tread thereon subject to wear, said tire tread comprising a plurality of spaced ribs forming voids therebetween, wearable rubber means positioned in one of said voids forming an integral part of the tread for indicating a plurality of predetermined degrees of wear, said means having a plurality of adjacent stepped surfaces at different distances from the bottom of the void, so positioned that they can be counted to determine tread wear, and be compared with the original number of steps, to determine the proportionate wear at any condition of wear, said means extending for a relatively small portion of the tread circumference, the stepped surfaces being disposed in at least two adjacent groups, a stepped surface on one group being disposed to indicate intermediate wear between adjacent surfaces of another group.

References Cited in the file of this patent

UNITED STATES PATENTS

| | | |
|---|---|---|
| 1,266,698 | Macbeth | May 21, 1918 |
| 2,265,543 | Overman | Dec. 9, 1941 |

FOREIGN PATENTS

| | | |
|---|---|---|
| 8,603 | Great Britain | 1900 |
| 149,853 | Great Britain | Aug. 26, 1920 |
| 459,835 | Great Britain | Jan. 15, 1937 |
| 799,105 | France | June 6, 1936 |

OTHER REFERENCES

The Saturday Evening Post, August 7, 1937, page 63.